Figure 1:
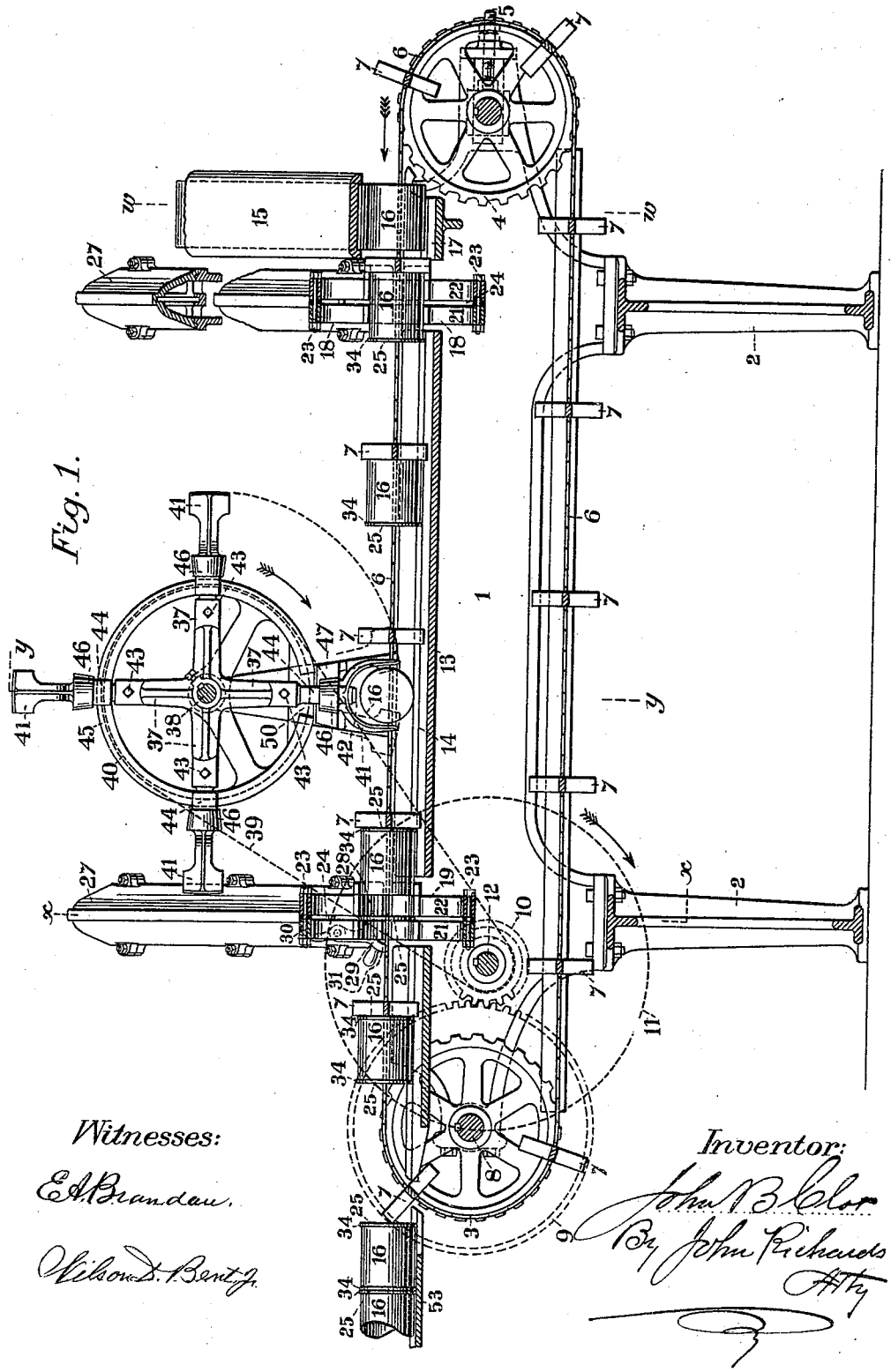

(No Model.)   3 Sheets—Sheet 1.

J. B. CLOT.
CAN HEADING MACHINE.

No. 544,722.   Patented Aug. 20, 1895.

Witnesses:
E. A. Brandau.
Nilson D. Bentz.

Inventor:
John B. Clot
By John Richards
Atty

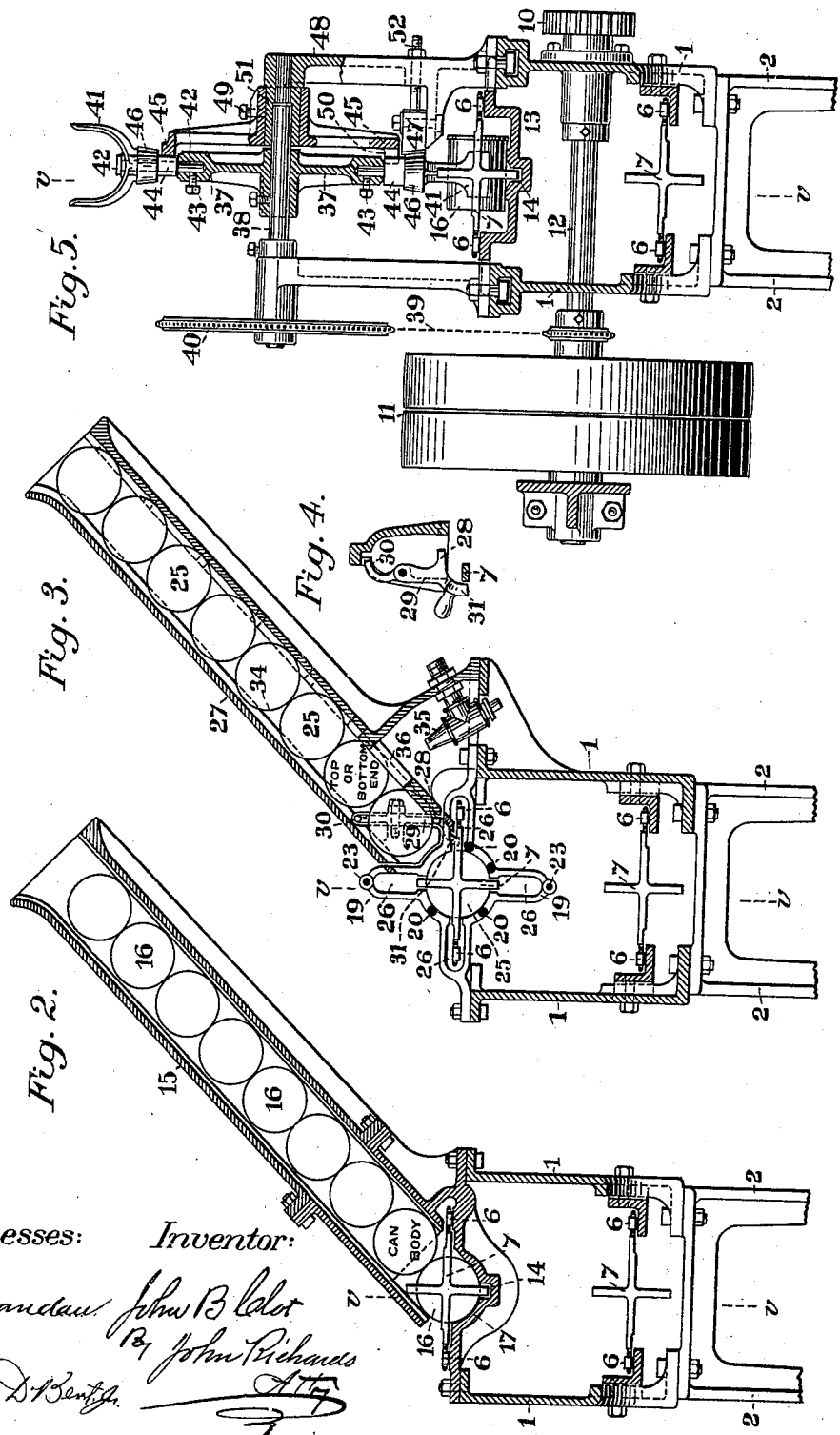

(No Model.)  
3 Sheets—Sheet 3.
J. B. CLOT.
CAN HEADING MACHINE.
No. 544,722. Patented Aug. 20, 1895.
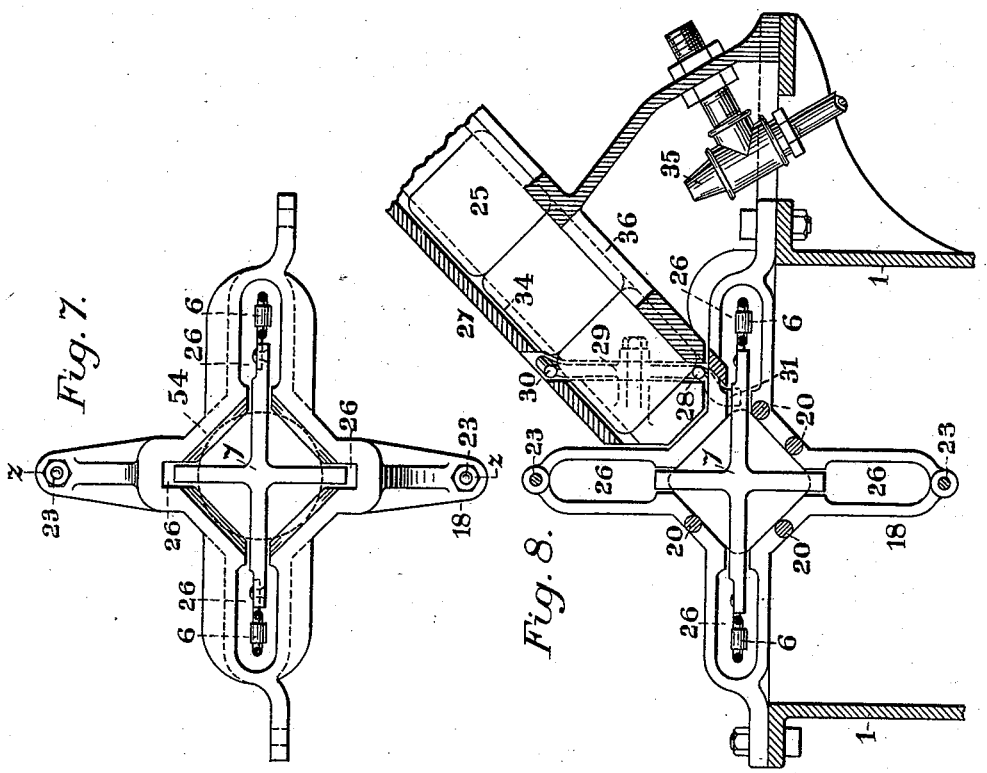
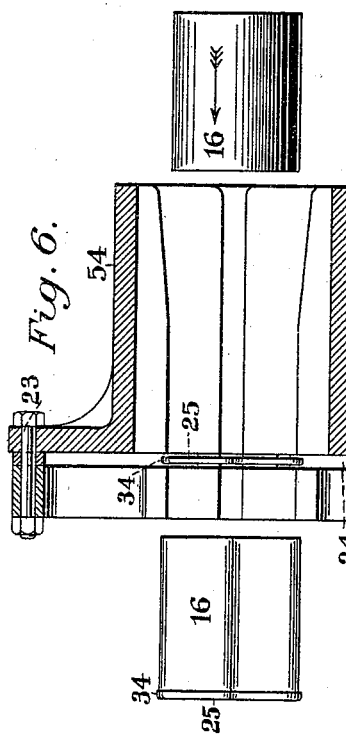
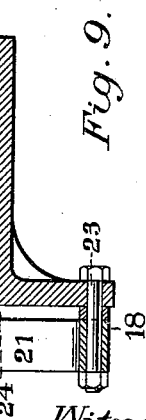
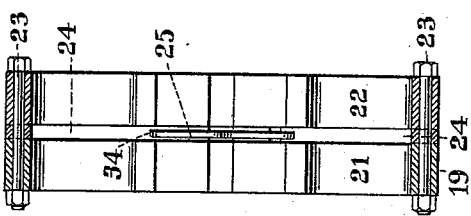
Witnesses:  
E. A. Brandau  
Wilson D. Bentz
Inventor:  
John B. Clot  
By John Richards  
Atty

UNITED STATES PATENT OFFICE.

JOHN B. CLOT, OF SAN FRANCISCO, CALIFORNIA.

CAN-HEADING MACHINE.

SPECIFICATION forming part of Letters Patent No. 544,722, dated August 20, 1895.

Application filed January 24, 1894. Serial No. 497,882. (No model.)

*To all whom it may concern:*

Be it known that I, JOHN B. CLOT, a citizen of the United States, residing in the city and county of San Francisco, State of California, have invented certain new and useful Improvements in Can-Preparing Machines for Placing the Heads on Can-Bodies, of which the following is a specification.

My invention relates to the processes for manufacturing packing-cans from sheet metal and possibly other material, such as stiff paper, that can be similarly treated, and to the process of applying the heads to the can-bodies after each of these have been prepared and previous to soldering the same.

My improvements consist in the employment of what may be called "compound flexible dies," pervious in form, through which the can-bodies are forced, preferably by means of an endless chain, the dies, which may be either round or square, expanding to meet any irregularity in the diameter of the cans such as occurs in their manufacture, bringing them to a true cylindrical or other required form, heating and applying the heads as the can-bodies pass through the pervious dies, the latter offering by flexure the required force or resistance to the heads to be forced on.

My invention also consists in mechanism to supply in regular sequence the can-bodies and their heads, so the operation of the machine can be automatic and continuous, also in means of heating and expanding the can-heads, with other details that will be more fully set forth in connection with the drawings, in which—

Figure 1 is a side elevation, partially in section, on the lines *v v* of Figs. 2 and 3, showing a can-head-placing machine constructed according to my improvements. Fig. 2 is a transverse section on line *w w* of Fig. 1, showing the method of feeding or supplying the can-bodies. Fig. 3 is another section on the line *x x* of Fig. 1, showing the method of feeding and supplying the heads for the cans. Fig. 4 is a detail of Fig. 3, showing a detent to deliver one head at a time into the path of the moving can-bodies. Fig. 5 is a section on the line *y y* of Fig. 1, showing the mechanism for inverting the can-bodies after one head has been applied. Fig. 6 is an enlarged sectional view of the flexible dies on the line *z z* of Fig. 7 as they are arranged to put on the first head when the can-bodies are to be made square or with rounded corners. Fig. 7 is a complete end view of Fig. 6. Fig. 8 is a transverse section through the same dies, including the feeding-chute for square can-heads, the detent mechanism to regulate the feed, and means of heating and expanding the heads before they are pressed on the can-bodies. Fig. 9 is a longitudinal section through the dies for placing the second heads on square cans.

Similar figures of notation are applied to corresponding parts in the different figures of the drawings.

In the manufacture of metallic packing-cans those to be hermetically sealed and exhausted of air are preferably made in cylindrical form, while those to hold dry substances and not subjected to external atmospheric pressure are preferably made square or with rounded corners to facilitate packing in boxes or cases. Hence my present invention is made applicable to any form of such cans, including polygonal or oval sections, the operation being almost identical in each case, except as to the shape of the dies through which the can-bodies are passed. By making the dies pervious so the can-bodies can pass through them, thus avoiding reciprocating and reverse motions of the machinery, simple and continuous operation is secured, as will now be pointed out in connection with the drawings.

The machine consists, essentially, of a main supporting-frame; two sets of pervious and flexible dies, of cruciform or other section that permits them to expand and through which the can-bodies are forced, taking up first one and then the other head on the way; two impelling-chains, between which the can-bodies are moved by struts or cross-bars between the chains; chutes and feeding devices to supply the can-bodies and the heads or ends therefor, the latter being heated and expanded at the time of being applied.

The main frame 1 is of the box or girder type supported on legs 2. At the rear or delivery end of the machine are two fixed chain-wheels 3 and at the other end two adjustable wheels 4, the bearings of the latter arranged to be moved outward or inward by means of screws 5, so as to regulate the tension. Around these wheels pass two continuous chains 6, on which are fixed at equal distances cross-bars or drivers 7, having both horizontal and vertical members that impel the cans, as will be hereinafter explained.

The chain or sprocket wheels 3 are fastened on the shaft 8, on the end of which is the gear-wheel 9, driven by the pinion 10 and the pulleys 11 on the shaft 12, as shown in Figs. 1 and 5.

Supported on the main frame 1 is a table or platen 13, the top of which forms ways to support the chains 6, the bottom having a groove or channel 14 to support and guide the can-bodies as they are carried through the machine by the chains 6 and cross-bars 7. This table or platen 13 is made in the form of a trough, wide enough to permit the cans 16 to be reversed, as shown in Fig. 5.

The feeding-chute 15 for can-bodies 16 is set at an inclination, as shown in Fig. 2, the open can-bodies descending by gravity and resting in a concave seat 17, fastened to the sides of the main frame 1, as seen in Fig. 2.

As the chains 6 move along, each of the cross-bars 7 sweeps out one can-body and carries it forward to the first set of dies 18 and forces it through these dies and at the same time into the can-head in the following manner:

The dies 18 and 19, the construction of which can be best seen in the enlarged views, Figs. 6 to 9, are the same in all respects for cylindrical cans, but are varied a little in construction for square cans, as will be explained in future. The dies are made in two parts 21 22, held together by screw-bolts 23, leaving between them a space 24 wide enough for the can-heads 25 to pass in between the two parts of the dies 21 22 and into the path of the can-bodies 16, as shown in Fig. 3. The dies 18 19 are of cruciform or other section that admits of expansion, pierced or slotted with passages 26 at the sides, top, and bottom, so the cross rails or drivers 7 can pass through the dies, and also for the purpose of rendering the dies flexible, so they will expand and contract, thus maintaining a constant pressure on the can-bodies 16, keeping these in true cylindrical form, providing for slight irregularities of their diameter; also, to permit the passage of the heads 25, which are larger in diameter than the can-bodies. By referring to Figs. 3, 7, and 8 the precise form of these dies will be clearly seen and their cruciform shape with central circular passage to receive the can-body and the lateral passage or arms communicating with said circular passage are all readily observable. Thus it will be readily understood that each part of the die is made of one piece of metal, and hence the circular passage in which the can-body is placed being solid and also made integral with the hollow arms that support it has a certain degree of elasticity, although it is a metallic casting, said elasticity being sufficient to allow of enough adjustment to keep automatically the can-bodies truly cylindrical. It is in this sense that I term the dies "flexible." The can-heads are supplied to and descend by the inclined chutes 27, as shown in Figs. 1 and 3. In the first set of dies 18 the heads 25 descend by gravity, the last or lower one resting against the stop-pin 20, concentric with the path of the can-bodies 16, so the heads will properly engage the can-body and be forced on. When the can-body passes, the heads 25 descend by gravity, so another one rests against the stop-pin 20. In the case of the second dies 19 the heads 25 are held back from the plane or path of the can-bodies, otherwise the tier of can-heads would rest against the passing can-bodies and catch on the head already applied by the dies 18. To obviate this, there is provided an automatic feeding device for the second set of dies 19, consisting of an oscillating detent 29. (Shown in Figs. 3 and 4 of the drawings.) By this device the last or lowest head rests against a pin 28 on the detent 29, which serves to release one head at a time, as they are required, and as each can-body 16 passes through the dies 18 and 19. This detent 29 (shown in side view at Fig. 4) is pivoted in the middle, and has two pins 28 and 30, that hold and release the heads 16, as required. As shown in side view, Fig. 4, and by dotted lines in Fig. 3, this detent 29 is holding the whole tier of heads 25 in the chute 27, the last or lowest head resting against the pin 28. As the drivers 7 move along, they come in contact with the extension 31 of the detent 29 and swing it so as to withdraw the pin 28 and protrude the pin 30 into the path of the heads 25. This permits the lower head to roll down into the path of the can-bodies 16 against the stop-pin 20 and detains the next head or the tier of heads, so none can escape until the detent returns by the gravity of the weight or handle 32 or by a spring, if required, to the position shown in Fig. 4, the driver 7 having passed beyond and disengaged the extension or claw 31. When the heads 23 roll down between the two parts 21 22 of the dies 18 and 19, they rest against the pins 20 or any other suitable stop to adjust the heads concentrically with the central portion of the dies 18 and 19 and with the moving can-bodies 16.

To insure that the lips or inturned flanges 34 will pass over the ends of the can-bodies 16, and also to clamp them firmly after they are placed, I employ some suitable means of heating and expanding the heads 25, preferably a gas-burner 35, that projects a flame through the aperture 36 to one or both sides of the head 16 and heats the chute 27 at this point, thus expanding the heads 25 so the inturned lip 34 will pass over the can-bodies 16 and afterward, by cooling and contraction, the heads 25 will be firmly held in place ready for soldering. The central bore of the rear part 21 of the dies 18 and 19 being smaller than the diameter of the heads 25, the resistance thus offered to the forward movement of the can-bodies 16 presses on the heads firmly, after which the can with the head in place is forced through the rear or second part 21 of the dies 18, the latter expanding in the manner before described to permit such passage. When the cans have the first head pressed on and have passed the first set of dies 18, they are reversed or turned around, so as to present the uncovered ends of the cans toward the second dies 19. This inversion of the can-bodies 16 is performed by the rotating skeleton wheel 37, mounted on the shaft 38 and driven by the sprocket-wheel 40 and a pitch-chain 39 from the shaft 12, as shown in Figs. 1 and 5. The rotation of this skeleton wheel being thus positive in respect to the movement of the chains 6 and the can-bodies 16, the forked jaws 41 meet the cans, as indicated by the dotted lines in Fig. 1, and then turn them around in the following manner: The forked jaws 41 are loosely fitted on the stems 42 and, except at one point, are prevented from turning by means of a squared portion 44, that bears against a circular guideway 45. This guideway 45 is held stationary on a nipple 51, formed integrally with the bracket 48 and fastened by a screw 49. This guideway 45 is not continuous, a section at the bottom being cut away, as shown at 50 in Fig. 1, so that at this point the forked jaws 41 are free to revolve on the studs 42. When the square part 44 of these jaws 41 pass into the space 50, a friction-plate 47 comes in contact with the circular portion 46 of the jaws 41 and revolves them half-way around, at the same time reversing the can-bodies 16, as shown in Fig. 1. The surface of the friction-plate 47 is covered with leather or other material that offers tractive resistance to the circular portion 46 of the jaws 41, and the required pressure is regulated by a screw 52.

The length of the friction-bar 47 and the diameter of the member 46 are so regulated as to produce, as nearly as possible, half a revolution of the jaws 41, but any deviation therefrom is at once rectified when the square portion 44 comes in contact with the circular guide 45. This brings the jaws 41 to their transverse position, as shown in the three upper or idle ones in the drawings.

The gearing to drive the skeleton wheel 37 is so arranged that the speed of the jaws 41 exceeds that of the chains 6 and drivers 7, so that while the can-bodies 16 are being turned around they are at the same time advanced or drawn forward, so as to clear the drivers 7, and when reversed will be in advance thereof.

After the can-bodies 16 are reversed, the drivers 7 come in contact with the end or heads already placed, and the cans are forced through the second dies 19, where the second head is applied in the same manner as the first one, and the completed cans pass off on a chute 53, or are collected in any convenient manner for soldering.

When the completed cans are to be of a square or other than a circular form, or with rounded corners, the processes are the same, except that the part 22 of the dies 18 is removed and substituted by a tapered forming-die 54. The can-bodies are prepared in cylindrical form, as shown in Fig. 6, and are pressed into square section by passing through the forming-die 54 to match the heads 25, which have been similarly shaped, as shown in Fig. 8, all other operations and results being the same throughout.

In this manner it will be seen the operation of the machinery is rapid and continuous, the heads for the cans falling by gravity loosely into a position concentric with the course of the continuously-moving can-bodies, and the resistance required to force the heads on is provided by flexible and expanding dies that maintain continually a pressure around the circumference of the can-bodies and the heads thereon until the operation is complete for both ends.

Having thus explained the nature and objects of my invention, what I claim is—

1. In a can-preparing machine, the combination with a die of cruciform section, of mechanism for propelling the can-bodies through said die, consisting essentially of endless chains or bands provided with cross-bars, substantially as described.

2. In a can-preparing machine, the combination with dies through which the can-bodies are passed, of reversing mechanism operating upon the can-bodies between the dies.

3. In a can-preparing machine, the combination with dies through which the can-bodies are passed, of reversing mechanism for said bodies, and mechanism for applying heads on both ends of the cans, substantially as described.

4. In a can-preparing machine, the combination of the dies through which the can-bodies are passed, the reversing mechanism for the bodies, and the propelling mechanism having cross-bars that likewise pass through the dies, substantially as described.

5. In a can-preparing machine, the combination of the dies through which the can-bodies are passed, said dies being transversely divided to provide intermediate head-receiving spaces, the reversing mechanism, the propelling mechanism, and the head-applying devices, substantially as described.

6. In a can-preparing machine, the combination of the flexible dies through which the can-bodies are passed, chutes to supply the can-heads in line with the can bodies, and a detent to release them one at a time so as to properly meet the can body, substantially as described.

7. In a can-preparing machine, the dies through which the cans pass, the reversing mechanism for the cans, and the propelling mechanism therefor, said reversing mechanism operating more rapidly than the propelling mechanism, so that the can body in being turned will advance beyond and clear the latter, substantially as described.

8. In a can-preparing machine, dies through which the cans are forced successively, chutes to supply the can heads, and in combination therewith a gas jet or other means of heating or expanding the heads as they pass into the dies and before they are pressed on the can bodies, in the manner substantially and for the purposes specified.

9. In a can-preparing machine, a main frame provided with drums or wheels at each end; a propelling device carried thereby and fitted with horizontal and vertical bars to propel the can bodies, and flexible dies through which the propelling mechanism passes, wherein and whereby the heads are forced on the can bodies, in the manner substantially and for the purposes described.

10. In a can-preparing machine, flexible dies through which the bodies pass successively, the first set of dies being provided with a forming nipple that by pressure converts the cylindrical section of the can body to a rectangular or other required section by flexure, in the manner substantially and for the purposes described.

11. In a can-preparing machine, for placing and adjusting the heads on can bodies, a pervious flexible die in which the first head is applied, said die consisting of two parts with a space between to receive the can heads and adjust them concentric with the moving can body, the front part of the die being bell-mouthed, tapered, and so formed as to press the cylindrical can bodies into rectangular or other required form, substantially in the manner and for the purposes specified.

12. In a can-preparing machine, a pervious flexible die consisting of two parts with a space between them to receive the can heads and adjust them concentric with the moving can body, a chute to supply the can heads in line with the can bodies, and mechanism for propelling the can bodies through the die, substantially as described.

13. In a can preparing machine, pervious dies through which the can bodies are passed, said dies being flexible or expansive so as to yield for variations of the can's diameter.

In testimony whereof I have hereunto affixed my signature in the presence of two witnesses.

JOHN B. CLOT.

Witnesses:
  ALFRED A. ENQUIST,
  WILSON D. BENT, Jr.